US011732728B2

United States Patent
Gebert et al.

(10) Patent No.: US 11,732,728 B2
(45) Date of Patent: Aug. 22, 2023

(54) DIAGONAL FAN WHEEL WITH INCREASED STRENGTH

(71) Applicant: ebm-papst Mulfingen GmbH & Co. KG, Mulfingen (DE)

(72) Inventors: Daniel Gebert, Öhringen (DE); Werner Haas, Dunningen (DE); Wolfgang Laufer, Aichhalden (DE); Tobias Sieger, Geisingen (DE); Eugen Usselmann, Bad Dürrheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 101 days.

(21) Appl. No.: 16/772,327

(22) PCT Filed: Dec. 13, 2018

(86) PCT No.: PCT/EP2018/084780
§ 371 (c)(1),
(2) Date: Jun. 12, 2020

(87) PCT Pub. No.: WO2019/115703
PCT Pub. Date: Jun. 20, 2019

(65) Prior Publication Data
US 2021/0364011 A1 Nov. 25, 2021

(30) Foreign Application Priority Data

Dec. 13, 2017 (DE) ............ 10 2017 011 503.6
Dec. 13, 2017 (DE) ............ 10 2017 011 504.4

(51) Int. Cl.
*F04D 29/32* (2006.01)
*F04D 29/38* (2006.01)
(Continued)

(52) U.S. Cl.
CPC .......... *F04D 29/384* (2013.01); *B29D 22/00* (2013.01); *F04D 19/002* (2013.01);
(Continued)

(58) Field of Classification Search
CPC .............................. F04D 29/325; F04D 19/002
See application file for complete search history.

(56) References Cited

U.S. PATENT DOCUMENTS

| 4,227,868 A | 10/1980 | Nishikawa et al. |
| 4,874,293 A | 10/1989 | Gutzwiller |
| 10,550,854 B2 * | 2/2020 | Lorcher ............... B29C 45/26 |

(Continued)

FOREIGN PATENT DOCUMENTS

| CN | 203175980 U | 9/2013 |
| CN | 105090106 A | 11/2015 |

(Continued)

OTHER PUBLICATIONS

International Search Report (in English and German) and Written Opinion (In German) in corresponding PCT Application No. PCT/2018/0847801 dated Mar. 28, 2019; ISA/EP.
Chinese Office Action dated Oct. 28, 2020 in corresponding Chinese Application No. 201880078441.X.
(Continued)

*Primary Examiner* — Sabbir Hasan
(74) *Attorney, Agent, or Firm* — Harness, Dickey & Pierce, P.L.C.

(57) ABSTRACT

A diagonal fan wheel (1) has a cover disk (2) and a bottom disk (3). A plurality of three-dimensionally curved blades (S) are arranged between the cover disk (2) and bottom disk (3). The blades (S) are connected to the cover disk (2) and bottom disk (3) in a materially bonded manner.

10 Claims, 4 Drawing Sheets

(51) Int. Cl.
    *F04D 19/00*     (2006.01)
    *B29D 22/00*     (2006.01)
    *F04D 29/28*     (2006.01)
    *F04D 29/42*     (2006.01)
    *F04D 29/52*     (2006.01)

(52) U.S. Cl.
    CPC ......... *F04D 29/281* (2013.01); *F04D 29/325* (2013.01); *F04D 29/4226* (2013.01); *F04D 29/522* (2013.01); *F05D 2230/20* (2013.01); *F05D 2240/14* (2013.01); *F05D 2240/30* (2013.01)

(56) References Cited

U.S. PATENT DOCUMENTS

| | | | |
|---|---|---|---|
| 10,724,539 B2 * | 7/2020 | Hub | .............. F04D 29/626 |
| 2016/0290348 A1 | 10/2016 | Mornan et al. | |

FOREIGN PATENT DOCUMENTS

| | | | |
|---|---|---|---|
| CN | 105715583 A | 6/2016 |
| DE | 102015207800 A1 | 11/2016 |
| DE | 102015118387 A1 | 5/2017 |
| EP | 2942531 A1 | 11/2015 |

OTHER PUBLICATIONS

India Examination Report dated Mar. 24, 2022 in corresponding India Application No. 202037022501.

\* cited by examiner

DIAGONAL FAN WHEEL WITH INCREASED STRENGTH

CROSS-REFERENCE TO RELATED APPLICATIONS

This application is a National Stage of International Application No. PCT/EP2018/084780, filed Dec. 13, 2018 and published in German as WO019115703A1 on Jun. 20, 2019. This application claims priority to German Patent Application No. 10 2017 011 503.6, filed Dec. 13, 2017 and German Patent Application No. 10 2017 011 504.4, filed Dec. 13, 2017. The entire disclosures of the above applications are incorporated herein by reference.

FIELD

This disclosure relates to a fan, particularly a diagonal fan wheel with increased strength. The disclosure particularly relates to a diagonal fan wheel with increased torsional strength, radial strength at high rotational speeds.

BACKGROUND

Ventilation systems are frequently equipped with comparatively low-speed fans, also called axial flow fans. They are operated by a propeller, also called fan wheel, air screw, or impeller. These fans are low-noise and particularly well suitable for applications where low-noise operation is desired. Various application, however, require high rotational speeds, that results in high mechanical strength requirements that the impellers must meet.

A fan or ventilator contains a plurality of fan wheel blades arranged around a shaft. High requirements are placed on such fan wheel blades. With regard to their dynamic mechanical properties, these fans should be able to operate in the range of high rotational speeds. This means that tensile stress caused by centrifugal forces and bending stress due to air delivery occur on the propeller blade.

A fan wheel designed as a diagonal fan wheel with a multitude of fan blades distributed about an axial axis of rotation is known from DE 102015118387 A1. The diagonal fan wheel has a cover disc that has an arched shape in radial section. The outer disk bottom side, at least in sections, rests on axial face sides of the fan blades and has an inlet opening about the axis of rotation. The cover disc, which is arched in radial section, has a radial inner section where a tangent angle to a radial plane of the fan wheel is greater than 45°. An outer section adjoins the inner section in a radial direction. In the inner section, on the top side, which is situated opposite the bottom side, of the cover disc, at least one air-guiding element that projects radially and axially from the top side of the cover disc. It has a guide surface pointing in a circumferential direction.

Another requirement is that the propeller blades must be weatherproof, particularly moisture and UV resistant. Temperature resistance in connection with mechanical strength is to cover a wide temperature range.

Imbalances are to be as small as possible to ensure extremely smooth running and wear-resistant and economical operation of the fans. The propeller blades should be as lightweight as possible to save energy. Thus, typical measures to increase strength by means of greater material thickness are undesirable.

It is known to manufacture fan impellers from fiber-reinforced plastic. For example, they are manufactured from glass fiber reinforced polyester or polyamide. To this end, propeller blades are manufactured in multiple parts, preferably in two parts, as upper and lower half-shells, respectively, by manual lamination in outside molds. The two half-shells are then joined into a propeller blade. For example, they are glued and overlaminated at the joint seam, thereby forming a hollow chamber.

This technology has the disadvantage that the wall thicknesses and the fiber content cannot be precisely reproduced by manual lamination. As a result, the propeller blades differ in weight. This results in imbalances in the propeller. To eliminate these imbalances requires a great effort.

Other known methods for improving radial strength and mechanical properties include appropriate material selection (higher-quality material), the reduction of notch effects at transitions by design measures, and the multi-part structure. These known measures show various disadvantages, which are to be avoided.

SUMMARY

It is therefore an objective of the present disclosure to overcome the known disadvantages and to provide a solution for a fan wheel, particularly a diagonal fan or diagonal fan wheel. It should be inexpensively produced and have improved mechanical properties. Accordingly specifically increased radial strength can be achieved in a fan configured.

This problem is solved by a diagonal fan wheel comprising: a cover disk and a bottom disk. Multiple three-dimensionally curved blades are disposed or extend between the cover disk and bottom disk. The curved blades are connected to the bottom disk and the cover disk in a materially bonded manner.

A first measure for optimizing the mechanical properties is an integral design of the impeller. A specific design is used that can be produced inexpensively using the typical manufacturing methods and can be reliably removed from the mold.

Another preferred measure, for improving the solution known from prior art is to form the cover disk in a specific shape. Particularly, provide a cylindrical contour of the cover disk, that transitions into an adjoining conical section. The transition from the cylindrical section to the conical section is not discrete, but continuous via a curved contour. Preferably, the transition has a specific radius, that transitions from the cylindrical section to the conical section.

The results in a hat-like shape where the conical section extends from a joining region from the transition from the cylindrical section into the conical section down to a bottom edge. This defines an imagined plane. The plane extends below an imagined plane through an upper edge region of the bottom disk. Thus, there is an overlap region with an intermediate space therebetween where the blades S extend from the outer surface of the bottom disk to the inner surface of the cover disk.

Another design improvement provides a bottom disk of the impeller where it is substantially conical.

In another advantageous embodiment of the disclosure, the impeller is designed such that a differential angle between cover and bottom disks is at least >1° preferably >2° in the conical regions. Corresponding positions on the cover disk and the bottom disk are viewed as reference for the differential angle.

It is further advantageous if the edge K, on the blade front edge of a blade, is formed as a sharp edge on the pressure side of the blade. The transition from the pressure side to the suction side of the blade is rounded. Thus, each blade has both a sharp and a rounded edge in the area of the air inlet.

In another advantageous embodiment of the disclosure, the inner surface of the cover disk is drawn towards the bottom disk at the point where the blade is attached. This increases strength and reduce turbulences. The outer contour remains rotationally symmetrical.

Further advantageously, the impeller and the rotor housing of the motor are designed as an integral part, in one piece. It is preferred that at least one metal part is molded, preferably injected, into the plastic part. The rotor bell, a return ring, the motor shaft, or the like can be used as the metal part. This combines various functions in the impeller and particularly ensures high strength.

In another advantageous embodiment of the disclosure, the blades can have a specific wall thickness distribution in their three-dimensionally curved extension. This improves their strength. To this end, individual or multiple continuous and discontinuous wall thickness regions can be provided for each blade, for example.

It is particularly advantageous in an embodiment where the thickness t of the blade viewed in the flow direction is between 30% and 60% of the maximum thickness between the front and rear edges. The maximum thickness t of the blade viewed in the flow direction is viewed in the region from the bottom disk to the cover disk where there are no rounded radii.

Other advantageous further developments of the disclosure are disclosed in the dependent claims or are explained in more detail below with reference to the figures and together with a preferred embodiment of the disclosure.

The drawings described herein are for illustrative purposes only of selected embodiments and not all possible implementations, and are not intended to limit the scope of the present disclosure,

DRAWINGS

DETAILED DESCRIPTION

The disclosure is described below with reference to an exemplary embodiment and to FIGS. 1 to 4. The same reference symbols indicate the same functional and/or structural features.

Figure 1:
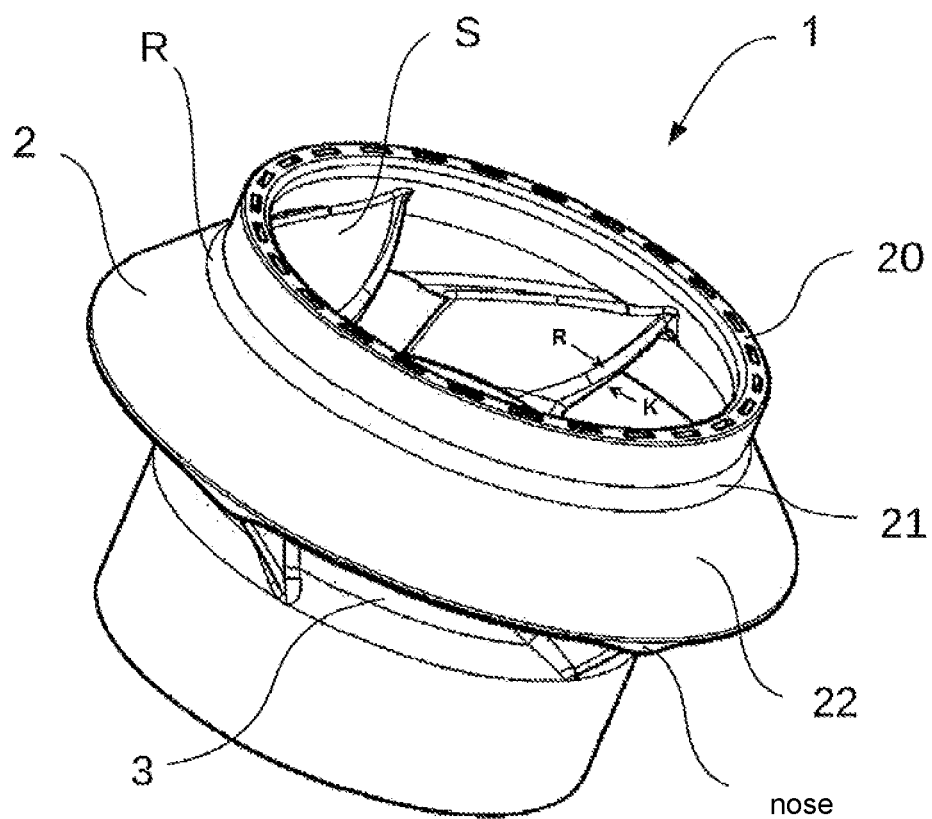
FIG. 1 is a perspective view of an exemplary embodiment of a diagonal fan wheel.

FIG. 1 is a perspective view of an exemplary embodiment of a diagonal fan wheel 1. The cover disk 2 of the fan wheel 1 is formed in a specific shape, namely, as a cylindrical contour 20 in the upper region. This cylindrical region 20 subsequently transitions into an adjoining conical section 22. The transition 21 from the cylindrical section 20 to the conical section 22 is not discrete. The transition section 21, transitions continuously via a curved contour having a specific radius R. The hat-like shape formed in this manner is designed such that the conical section extends from a joining region (radius R) from the transition from the cylindrical section 20 into the conical section 22 down to a bottom edge 24. This defines an imagined plane. The plane extends below an imagined plane through an upper edge region of the bottom disk. Thus, there is an overlap region with an intermediate space therebetween where the blades S extend from the outer surface of the bottom disk 3 to the inner surface of the cover disk 2.

As is further visible in FIG. 1, the cylindrical section 20 can be formed by a wall construction where a multitude of hollow chambers are provided.

It can further be seen in FIG. 1 that the bottom disk 3 of the impeller 1 is substantially conical. Thus, it forms a conical region 30. A cylindrical region, like the cover disk 2 can also be formed from a wall construction where a multitude of hollow chambers are provided, adjoins the conical region of the bottom disk 3.

The impeller 1 is designed such that a differential angle (of the tangents placed on the conical section) between the cover and bottom disks 2, 3 is at least >1°, preferably >2° in the conical regions 22, 30. This means that the angle of attack of the conical region of the cover disk 22 differs by at least 1° with respect to the angle of attack of the conical region 30 of the bottom disk 3. Advantageously, the angle of attack, angle between the tangent placed on the conical region and the central cylindrical axis through the cylindrical region of the cover disk, is greater than the angle of attack of the conical region of the bottom disk. For example, the angle of attack of the cover disk can be between 46° to 60°. The angle of attack of the bottom disk is between 30° and 45°.

The edge K on the blade front edge on the pressure side of the blade S is configured as a sharp edge. The transition R from the pressure side to the suction side of the blade S is rounded (formed with a radius R) (see the details in FIG. 1).

Figure 2:
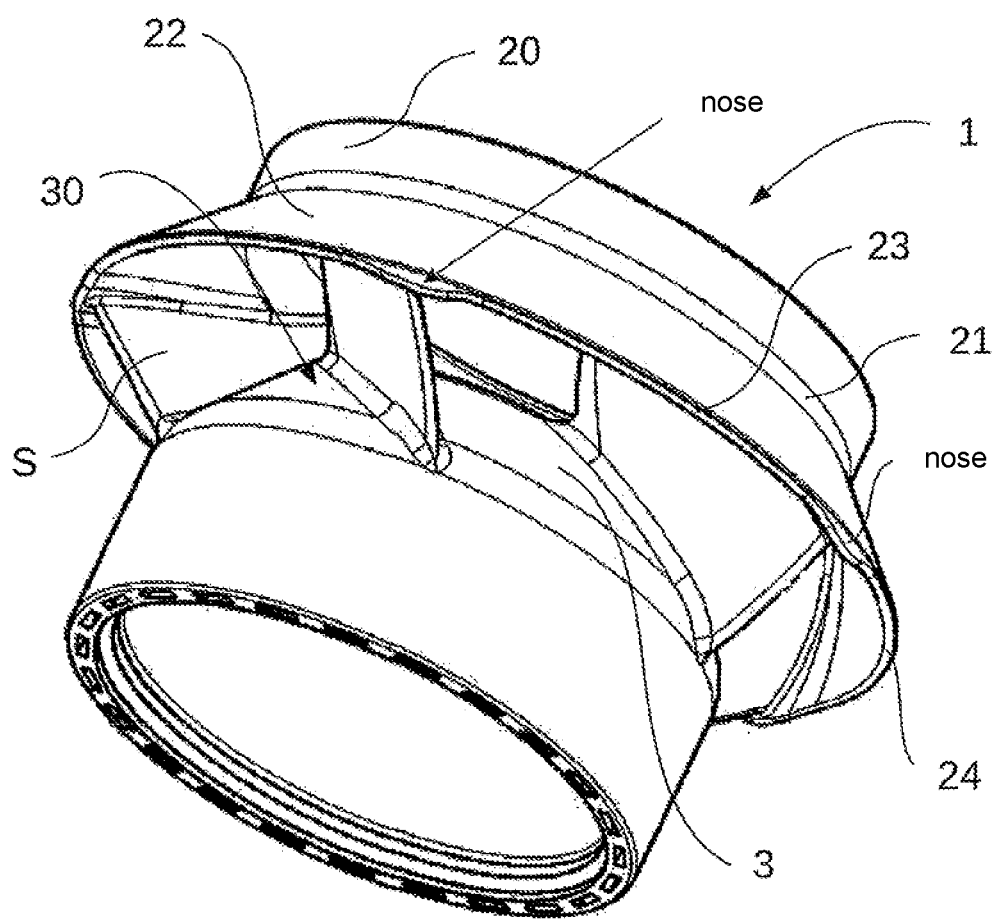
FIG. 2 is a perspective view of the diagonal fan wheel from FIG. 1.

The inner surface of the cover disk 2 at the blade attachment point 23 is drawn in the direction of the bottom disk 3. Thus, a drawn nose projects from the edge 24 that other wise is a circular line. This increases the strength and reduce turbulences. The outer contour remains rotationally symmetrical, as can be seen in the view of FIG. 2. The noses may alternatively be disposed at discrete positions along the edge 24. The noses are shaped such that their cover surfaces, upper surfaces, are formed as extensions of the conical cover disk. Thus, they have the same angle of attack as the cover disk. This means that the tangent on the surface of the cover disk also extend as a tangent in the region of the nose.

The contour of the edge 24 in the region of the nose(s) corresponds to a Gaussian distribution curve. The flanks extend asymptotically and continuously into the edge 24 (that is, without a kink) or sudden change.

Figure 3:
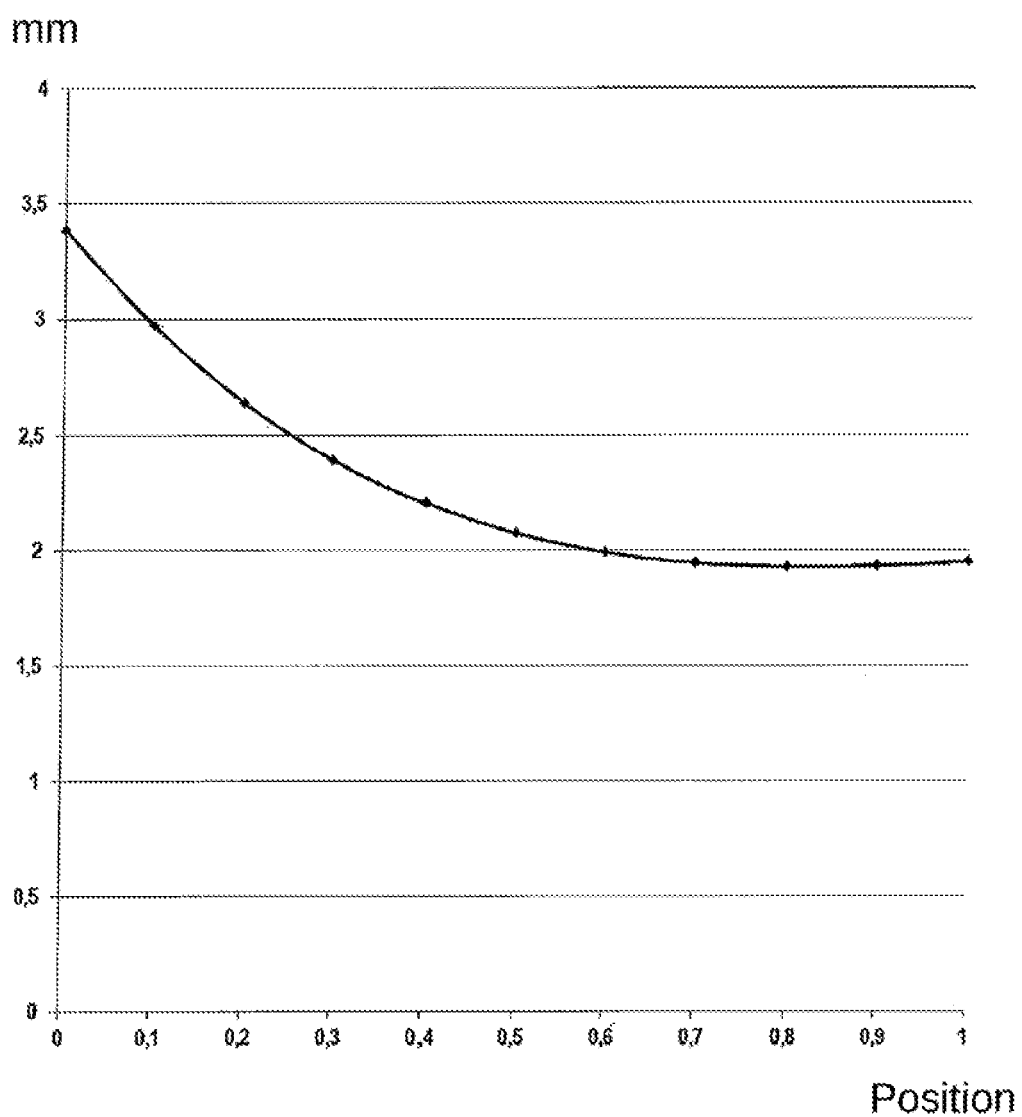
FIG. 3 is a graph representing the connection between the maximum material thickness of the blade viewed in the flow direction along the blade from the bottom disk to the cover disk.
Figure 4:
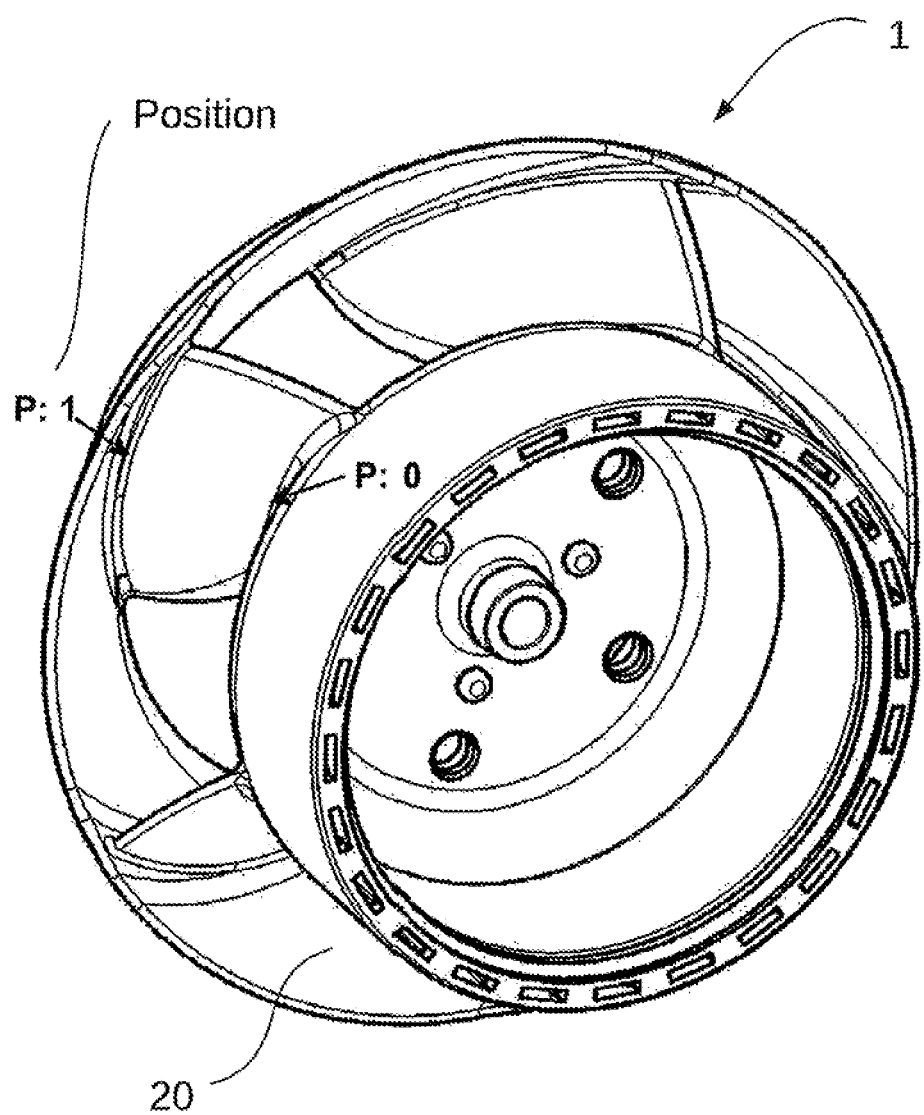
FIG. 4 is a perspective bottom view of the diagonal fan wheel, representing positions between which the maximum material strength changes.

The blades S have a specific continuously changing wall thickness distribution over their three-dimensional extension. The distribution is shown in FIG. 3. The wall thickness distribution between the positions P=0 (attachment to the bottom disk 3) and P=1 (attachment to the cover disk 2) increases the strength of the radial fan wheel 1. The maximum wall thickness is about 3.4 mm in the attachment region on the bottom disk 3. It continuously decreases in a non-linear manner towards the cover disk 2. The maximum thickness is approx. 2 mm at the cover disk 2.

It is preferred that the wall thickness distribution is detected on the outer, i.e. exterior edge and can decrease differently in the region closer to the center (due to the different spacings between the bottom disk and the cover disk). But in principle, the wall thickness of the respective blade S decreases from the bottom disk towards the cover disk. It is also conceivable that one or more blades each have a different wall thickness distribution, wherein a rotationally symmetrical design must be retained.

The implementation of the disclosure is not limited to the preferred embodiments described above. Instead, a plurality of variants is conceivable where the solution described is used for completely different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A diagonal fan wheel comprising:
a cover disk and a bottom disk both radially extending outwardly from an axis of the diagonal fan, at least one of the cover disk and bottom disk including a wall construction portion, the wall construction portion extending axially along the axis of the diagonal fan, the wall construction portion including a multitude of elongated hollow chambers that extend axially in the wall construction portion;
multiple three-dimensionally curved blades are disposed or extend between the cover disk and the bottom disk;
the curved blades are connected to the bottom disk and the cover disk in a materially bonded manner.

2. The diagonal fan wheel according to claim 1, wherein the diagonal fan wheel is designed both integrally and in one part.

3. The diagonal fan wheel according to claim 1, wherein the cover disk of the fan wheel is formed in a specific shape comprising a cylindrical contour adjoined by a conical section and a transition from the cylindrical section into the conical section is not discrete, but transitions continuously via a curved contour having a predetermined radius R.

4. The diagonal fan wheel according to claim 1, wherein the bottom disk is substantially conical and forms a conical region.

5. The diagonal fan wheel according to claim 1, wherein the impeller is configured such that a differential angle of a tangent placed on a respective upper surface of the cover and bottom disks between the cover and the bottom disks is at least >1° (greater than 1°) in the conical regions.

6. The diagonal fan wheel according to claim 1, wherein an edge on a blade front edge on a pressure side of a respective curved blade is configured as a sharp edge, in a transition from the pressure side to a suction side of the curved blade is rounded or formed with a rounded edge region.

7. The diagonal fan wheel according to claim 1, wherein an inner surface of the cover disk is configured drawn towards the bottom disk at a blade attachment such that a drawn nose projects from an edge, the edge otherwise extending on a circular line formed on the edge.

8. The diagonal fan wheel according to claim 1, wherein an outer contour of the cover disk is rotationally symmetrical.

9. The diagonal fan wheel according to claim 1, wherein the curved blades have a specific continuously changing wall thickness distribution in their three-dimensionally curved extension.

10. A diagonal fan wheel comprising:
a cover disk and a bottom disk, at least one of the cover disk and bottom disk including a wall construction portion extending axially with respect to an axis of the diagonal fan, the wall construction portion has a multitude of axially extending elongated hollow chambers in the wall construction;
multiple three-dimensionally curved blades are disposed or extend between the cover disk and the bottom disk;
the curved blades are connected to the bottom disk and the cover disk in a materially bonded manner.

* * * * *